DIGITAL DATA PROCESSING APPARATUS

Filed Feb. 4, 1964

INVENTORS
FRED B. COX Jr.
AND PAUL O. LINDFORS
BY
Wagner & Ponty and
Martin J. Finnegan
ATTORNEYS INVENTORS
FRED B. COX Jr.
AND PAUL O. LINDFORS
BY
ATTORNEYS Oct. 3, 1967 F. B. COX, JR., ETAL 3,345,617

DIGITAL DATA PROCESSING APPARATUS

Filed Feb. 4, 1964 3 Sheets-Sheet 3

INVENTORS
FRED B. COX JR.
AND PAUL O. LINDFORS
BY
[signature] and
[signature]
ATTORNEYS United States Patent Office 3,345,617

Patented Oct. 3, 1967

3,345,617

DIGITAL DATA PROCESSING APPARATUS

Fred B. Cox, Jr., Fullerton, and Paul O. Lindfors, Woodland Hills, Calif., assignors to the United States of America as represented by the Secretary of the Air Force Filed Feb. 4, 1964, Ser. No. 342,573
4 Claims. (Cl. 340—172.5)

The invention described herein may be manufactured and used by or for the United States Government for governmental purposes without payment to us of any royalty thereon.

This invention relates to high speed computing and digital control equipment, and more particularly to data processing equipment capable of converting concurrent pulse duration, frequency modulation, pulse amplitude, and code modulation data to digital form and merging this data into a time-correlated output format.

A digital data processing system (DDPS) is used in processing massive amounts of test data. Prior art systems have not demonstrated an ability to convert raw test data acquired in various formats (e.g., pulse duration modulation (PDM), PAM, pulse code modulation (PCM), serial digital, punch card, etc.) to suitable format for entry into a large digital computer; nor have prior art data processing systems permitted the simultaneous receipt of real-time data inputs from telemetry and other range sources for direct entry of processed data into a large digital computer.

Accordingly, an object of the present invention is to provide digital data processing methods and apparatus capable of processing simultaneously different types of input data.

Another object of this invention is to provide a digital data processing system capable of almost unlimited expansion to prevent obsolescence.

Still another object of this invention is to provide a digital data processing system capable of acccepting raw input data from either magnetic tape or from telemetry or other real-time sources by simple repatching.

A still further object of the present invention is to provide a digital data processing system capable of either recording output data on computer-compatible magnetic tape or to feed the output directly to the input channel of a general-purpose computer, or both simultaneously.

A primary object of this invention is to provide a digital data processing system capable of processing data from more than one pulse duration modulation commutator at a time and to generate the output data from the parallel inputs in a merged format—independent of any particular method of converting pulse duration modulation data to digital form.

And another primary object of this invention is to provide a digital data processing system capable of converting multiple channels of rate data (tachometer type) to digital form concurrent with pulse duration modulation-to-digital conversion and merging this data into a time-correlated output format.

To the accomplishment of the foregoing and related ends, this invention then comprises features hereinafter fully described and particularly pointed out in the claims, the following disclosure setting forth in full detail illustrative embodiments of the invention, these being indicative, however, of but a few of the various ways in which the principles of the invention may be employed.

The invention is illustrated with reference to the drawings wherein.

Figure 1:
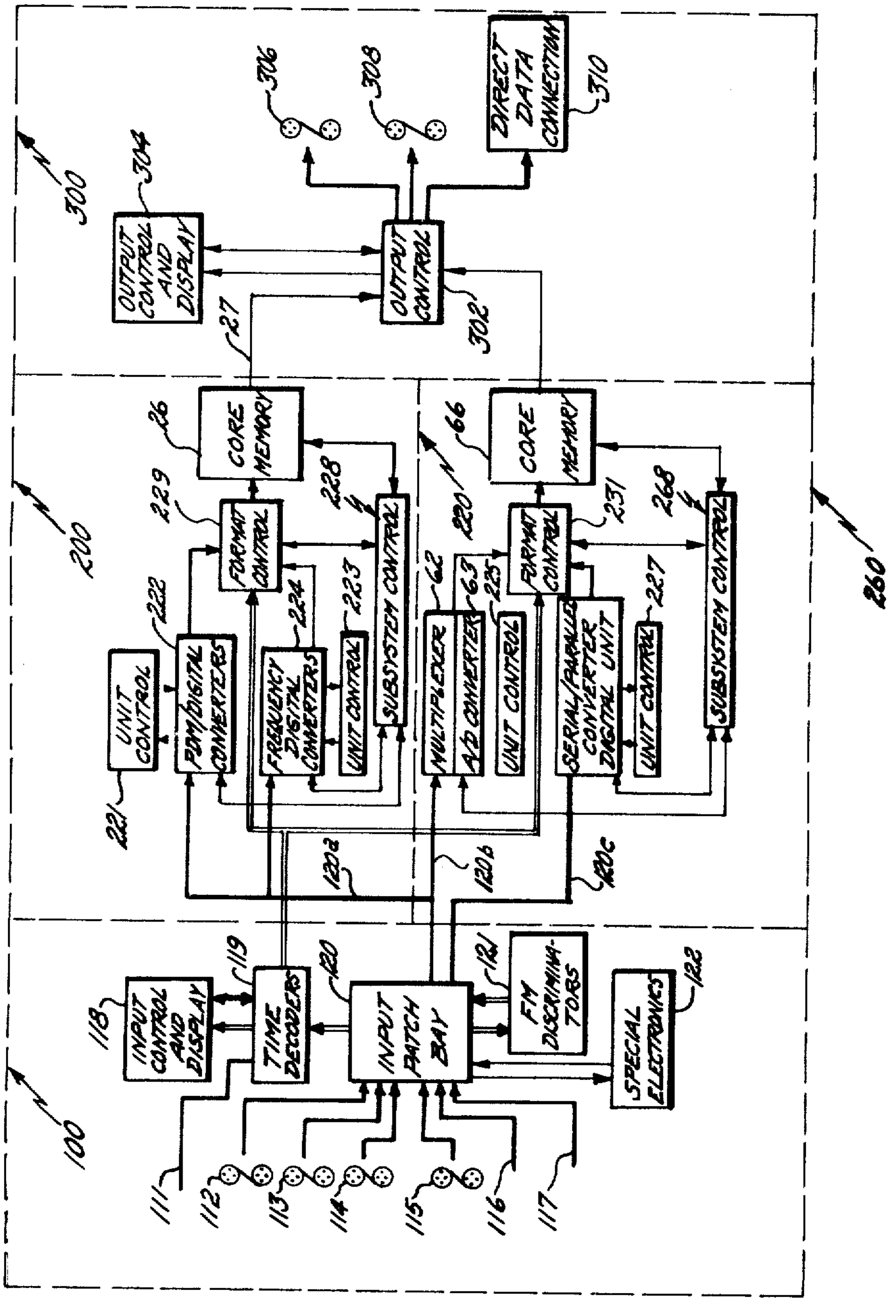
FIG. 1 is a block diagram of the complete digital data processing system.

Now referring to FIG. 1, the digital data processing system converts raw data acquired in various formats (for example, range time 11, data magnetic tapes 12–14, pulse code modulation 15, telemetry 16, or radar 17) to a suitable format for entry, for example, into magnetic tape 306 and 308 for subsequent computer input or for direct input into an IBM 704/7090 digital computer 310. As shown in FIG. 1, the instant digital data processing system comprehends the utilization of three basic parts: an input system 100, through which, for example, data is fed by magnetic tape; a processing system 200, which converts the signals into the necessary digital forms for computer use; and an output system 300, which puts the converted signals on magnetic tape and feeds it to the computer. More particularly, the invention teaches the utilization of two independent subsystems: pulse duration modulation/rate subsystem 220 and analog/digital subsystem 260. These subsystems each contain a 2040 word memory 26 and 66 which is used as a storage buffer between the input and output devices. This temporary storage buffer compensates for the difference in rates at which input data is processed and the rate at which data must be transferred to the output utilization device.

Figure 2:
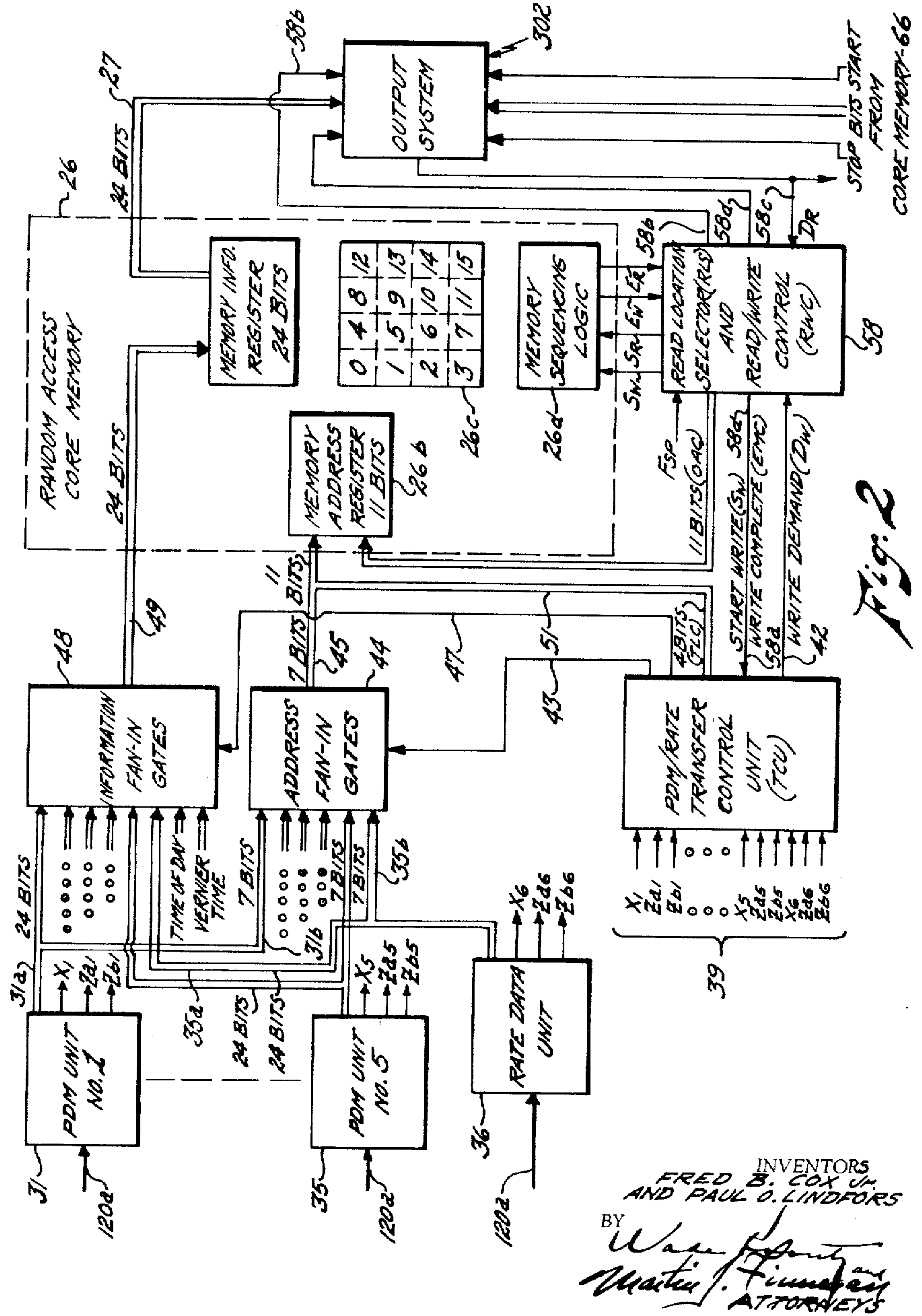
FIG. 2 is a block diagram of the pulse duration modulation/rate subsystem control; and, FIG. 3 is a block diagram of the multiplexing and analog/digital conversion subsystem control.

Now referring to FIGS. 1 and 2, pulse duration modulation/rate subsystem 220 provides the capability for conversion of pulse duration modulation data to digital form. Subsystem 220 also provides concurrent conversion of sinusiodal rate data to digital form (frequency-to-digital conversion) and for merging the pulse duration modulation and rate data into a standard output format.

The pulse duration modulation/rate subsystem will process simultaneous inputs received from up to five IRIG/standard commutators and merge this data into a standard output format. The data input formats for the three IRIG standard comutator configurations are: 30 channels (30 samples/sec./channel); 45 channels (20 samples/sec./channel); 90 channels (10 samples/sec./channel).

No decommutation or zero and full-scale correction computations are performed on the input data. Pulse duration modulation data pulses are fed to the pulse duration modulation units from magnetic tape playback amplifiers. All pulse width samples are converted to digital form and transmited as raw pulse width counts to the output.

To allow any combination of commutator sizes to be processed simultaneously, the basic output frame of data for any commutator is 90 words. Thus, three input frames from a 30-channel commutator are required to produce one output frame; two input frames from a 45-channel system are required for one output frame. There is a one-to-one correspondence between input and output frames for a 90-channel commutator.

An output record is composed of one output frame for each commutator input. If rate data is processed concurrently, then the output record will also contain a 90-word frame of rate data, regardless of the number of rate channels processed (blank words are inserted in the rate data output record if necessary to preserve the 90-word format). The output record always contains a multiple of 90 data words, ranging from 90 for one commutator input to 450 words for 5 commutator inputs. The record length can go up to 540 words if rate channels are processed concurrently with the 5 pulse duration modulation commutators.

Briefly, the basic sequence of operation of pulse duration modulation/rate subsystem control 228 (referring to FIG. 2) is as follows: data generated by pulse duration modulation units 31–35 (only those units used in a given run) are transferred to memory 26 during the input frame of the synchronizing pulse duration modulation unit (not shown). During this interval, a complete 90-word frame of data will be stored in memory 26 for each operating pulse duration modulation unit since all units perform simultaneous conversion operations. The set of frames thus stored comprises a complete record of output data. Data received during a given frame will be stored in one half (upper or lower) of 2048 word memory 26. When the frame is completed, the control elements are signalled to initiate readout of the data just stored. At the same time, the control logic switches the data storage operation to the other half of memory.

The storage and readout operations are interlaced during the readout interval by the control logic. The entire stored record must be read out in time for a suitable stop delay to occur before storage of the next record has been completed in the other half of memory. If the input rate limitation is observed, no data will be lost since storage and readout operations are performed in opposite halves of memory.

As shown in FIG. 2, the main subsystem control elements are: pulse duration modulation/rate transfer control unit (TCU) 41, and the read location selector (RLS) and the read-write control (RWC) 58. Storage buffer 26 is a 2048 word, 24 bit per word, random access magnetic core memory. A detailed description of this memory is contained in the Computer Control Company's manual, "Instruction Manual Magnetic Core Memory System 2-TCM 2048/24." The memory clear-write and read-regenerate cycles are 6 microseconds. Data is entered into memory and read from memory as 24-bit parallel words via memory information register (MIR) **26*a*. The storage location of input data or the location of an output word is determined by the 11-bit word contained in memory address register (MAR) 26*b***.

Data is received from the five pulse duration modulation units (31–35) and routed to memory information register **26*a* via information fan-in gates 48. Data generated by rate data unit 36** is also transferred in the same way; the control and transfer logic being designed to accommodate the rate data unit when it is operative. It might be noted that an additional pulse duration modulation unit could be placed in this position if desired, or indeed any type of processing unit provided the input data rates and formats are made compatible with those of the pulse duration modulation input data.

The 7-bit channel address from the channel address counter (CAC) (not shown) in each pulse duration modulation unit (31–35) is also used to partially select the memory address for storage of the word, and hence the 7-bit address lines **31*b*–35*b* from each pulse duration modulation unit are routed to address fan-in gates 44**.

Transfer of information to memory information register **26*a* and address to memory address register 26*b* is controlled by transfer control unit 41 in the following manner: when a given pulse duration modulation unit has a data word ready for storage, the data demand ($X_i$) for that unit is turned on. Similarly, time of day demands ($Z_{ai}$) and vernier time demands ($Z_{bi}$) are generated from time word storage. Since data and time demands may occur simultaneously from two or more processing units, transfer control unit 41 scans the demand lines ($X_i$, $Z_{ai}$, $Z_{bi}$) until an "on" condition is detected, at which time scanning is inhibited. Transfer control unit 41 then generates a write demand ($D_W$) 42 to read-write control 58. At the same time, gating levels 43 and 47 are generated by transfer control unit 41 upon detection of the demand input so that information and address words from the processing unit being serviced are passed through fan-in gates 44 and 48 to memory address register and memory information register input gates 26*b* and 26*a*, via lines 45 and 47. Read-write control 58 generates a start-write command ($S_W$) 58*a* when such a command does not interfere with a read-regenerate cycle. Command 58*a* strobes the parallel information and address bits into memory information register and memory address register (26*a* and 26*c*) and initiates the clear-write cycle which stores that data word in memory 26. After the clear-write cycle for that sample is started, the input demand is turned "off" and transfer control unit 41 again scans demand lines 39** for new inputs.

Time of day demands ($Z_{ai}$) and vernier time demands ($Z_{bi}$) are serviced by transfer control unit 41 in the same manner. The address in memory in which these words are stored is determined by contents of the channel address counter in the unit demanding a time word sample.

Since the processing units operate in parallel, data samples are received at memory information register **26*a*** in a random manner. However, these words must be sorted according to the pulse duration modulation unit which generated them so that the desired sequential output format may be achieved. This sorting is accomplished as the samples are stored in memory so that a sequential readout of memory cells will produce the proper ordering of the data.

The 2048 word memory 26 is logically divided into sixteen blocks **26*c* of 128 words each, and data received from a given pulse duration modulation unit is stored in one of two blocks associated with that unit. For example, pulse duration modulation unit 31 is assigned to blocks 1 and 9, pulse duration unit 32 to blocks 2 and 10, and so on. Blocks 0, 7, 8, and 15 are not used in the instant embodiment but can be assigned to other processing elements as required. Channels 1 through 90 for a pulse duration unit are stored in cells 1 through 90**, respectively, within the block assigned to that unit. The same is true for all other units in use.

To understand the sorting operation assume, as an example, that a demand for channel 21 in pulse duration modulation unit 32 has been detected by transfer control unit 41. The channel address counter in pulse duration modulation unit 32 will contain the number 21 and the scanning element in transfer control unit will contain the number 2, at the time scanning is stopped to service the demand. These two numbers are combined in memory information register **26*a* to address cell 21 in logical memory block 2**, and hence the data sample is stored in the desired location. The same action takes place for samples received from all processing units, and the result is a sequential ordering in memory of data by track and channel.

Data readout from memory is initiated at the end of each 90-channel frame of the synchronizing unit. Since the pulse duration modulation units operate in parallel, all units will nominally complete one frame in the same length of time. To select the synchronizing pulse duration modulation unit, the frame sync pulse output ($nZ_1+Z_6$) for that unit is patched into the hub (not shown) on the patchboard in input patch bay 120 (FIG. 1). There are 5 sets of input-output patches corresponding to the five PDM units. Pulse 60 is the master frame pulse for the entire system. There appears to be no general criteria for selection of the synchronizing unit, and an arbitrary selection may generally be made.

Master frame pulse, 60, occurs every 0.1 second (nominal) since the frame sync pulse from any pulse duration modulation unit is generated for each 90 input channels (at 10 90-channel frames-per-second) processed. Master pulse duration modulation frame sync 60 generates START command **58*b* which instructs output sytem 302 to initiate readout. When the output system is ready for the first word, it generates read demand ($D_R$) 58*c*** to initiate transfer of the first word from memory.

Read location selector 58 controls the data readout operations. When master pulse duration modulation frame sync ($F_{SP}$) 60 occurs, START command **58*b* is generated as previously described. Read location selector 58 also contains the address of the channel to be read. This address is instructed by master pulse duration modulation frame sync 60 to read the first word of the output record from the first memory block in use. When read demand 58***c* occurs, read location selector 58 signals the read-write control to initiate readout and controls the transfer of the data to output system 302.

Read location selector 58 is designed to readout only the first 90 cells within the memory blocks in use. The read location selector will read no data from a block corresponding to a pulse duration modulation unit which is not being used.

To understand the read out operation, assume, for example, that pulse duration modulation units 32 and 35 are in operation. Then read location selector will readout cells (channels) 1 through 90 from block (pulse duration modulation unit) 32 followed by cells (channels) 1 through 90 from block (pulse duration modulation unit) 35. STOP command 58*d* is then generated to halt readout until the next frame. This produces the required format for the assumed combination of inputs.

It should be noted that read-write control 58 controls the interlace of read and write cycles so that the two operations never overlap. Once a read or a write cycle is initiated, read-write control 58 inhibits initiation of another cycle until completion of the cycle in process. Read-write control gives preference to read demand 58*c* over write demand 42 should the two occur simultaneously, because there is less time between successive readout commands than between input commands.

During the frame interval of the synchronizing pulse duration modulation unit, input data samples from all processing units are read into cells in the lower-half of memory (blocks 0 through 7) while data is being read out 27 to output system 302 from upper-half memory (blocks 8 through 15). Control of the half of memory in which data is recorded is determined by a 3-bit binary counter (not shown) in transfer control unit 41 which scans the demand inputs from the pulse duration modulation units and which coacts with a fourth bit toggled by master pulse duration modulation frame sync pulse 60, said fourth bid controlling the particular half of memory via lead 51. During the next frame, data is written into upper-half memory and read out of lower-half memory. In this manner, input data from a previous frame are not erased before they are transferred to output system 302.

Figure 3:
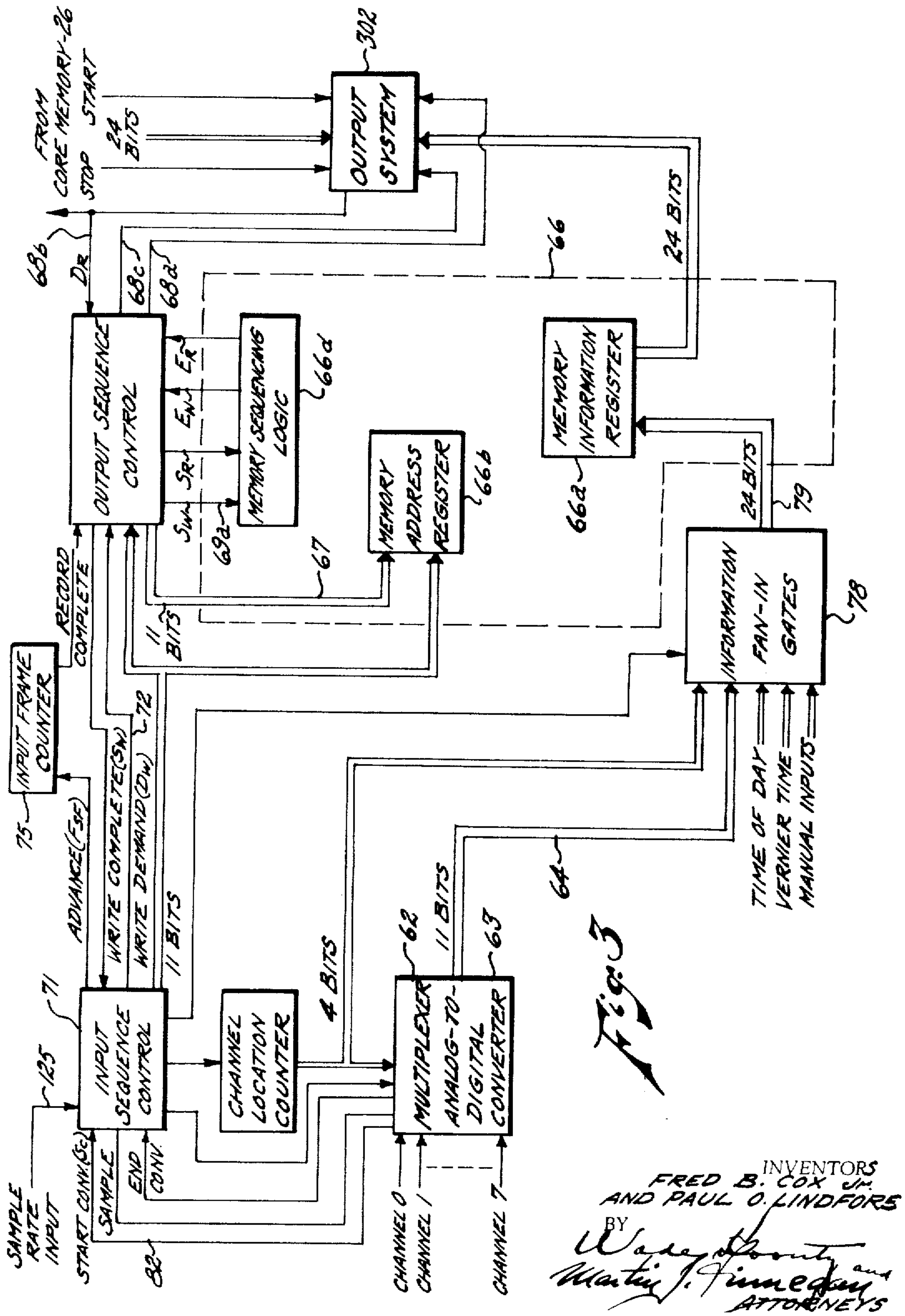

Now referring to FIGS. 1 and 3, analog/digital subsystem 260 processes data received as analog voltages 120*b*, or as digital words, either in serial, parallel, or serial-parallel form 120*c*. The instant embodiment can multiplex and convert up to eight analog voltage channels simultaneously or process serial digital inputs up to 24 bits per word, and series-parallel inputs from the 400 c.p.m. punched card reader. This system can be implemented to provide processing pulse code modulation data, digitized Askania camera inputs, and quantized space-time data from high-speed sled runs. Addition of this increased capability will not require modification of the basic control logic.

Operations on data in analog/digital subsystem 260 are similar to those performed in pulse duration modulation/rate subsystem 220 in that on-line computations are not performed. The basic operations performed are multiplexing, conversion, shifting, and formating. Format control is achieved by use of 2048×24 random access magnetic core memory 66, identical to pulse duration modulation/rate subsystem memory 26. The output is an IBM 704/7090-compatible tape 306 or 308 at either 200 or 555 bits/inch.

Multiplexer 62 is Packard Bell Model SHM-2-8 and analog-to-digital converter 63 is Packard Bell Model M2-11B/B Multiverter. A model SH-3 sample-and-hold amplifier is contained as an integral part of multiplexer 62. Detailed descriptions of the theory and operation of these units are contained in the manuals for the respective units.

Briefly, the basic operation on analog voltage inputs is as follows: multiple input channels 120*b* are fed into multiplexer 62 which periodically samples the input voltage amplitudes simultaneously and stores these sampled voltage levels in a hold circuit associated with each input channel. The analog voltage levels are then sequentially converted to 11-bit (10 bit plus sign) binary numbers 64 by analog-to-digital converter 62.

After a sample is converted to digital form, it is stored in magnetic core memory 66. Address and special code bits used to denote the tape track number are inserted into the data sample as it is stored in memory. Time words are also stored at periodic intervals. Time words and data samples are accumulated in memory until a preselected number of words (one record) have been stored. Output system 302 is then signalled and this block of words (record) is transferred from memory to output system 302.

More particularly, the basic operation of the over all analog/digital subsystem 260 may be understood with the aid of FIG. 3. Input voltages 120*b* are fed into multiplexer 62 or analog-to-digital converter 63 and sampled at a rate determined by the sample rate input 125. This sample may be derived from any suitable external timing source or may be generated by an internal sample rate generator.

For multiplexed input channels a frame of data consists of two time words (time-of-day and vernier time, fixed at 4 characters each) followed by one word for each input sample. An output record comprises 1 to 999 input frames. Each frame contains $N+2$ words for N multiplexer input channels in use. The output data word length is variable from 1 to 6 characters.

Multiplexer 62 samples all inputs simultaneously at the start of each frame and under control of input sequence control (ISC) 71.

Initially input sequence control 71 starts the sample and conversion operation of analog-to-digital converter 63 when sample pulse 125 occurs. During the time that this conversion is taking place, input sequence control 71 samples time-of-day and vernier time and stores these words in memory in that order. These words are stored before the first sample has been converted by analog-to-digital converter 63. For example, the multiplexer channel address is set to that of the first input channel and this channel of data is transferred from multiplexer 62 to analog-to-digital converter 63. Analog-to-digital converter 63 then initiates conversion of this vlotage sample to an 11-bit binary number 64.

When the first sample has been converted, to carry out storage of this word, analog-to-digital converter 63 sends pulse 82 to input sequence control 71 which in turn generates a write demand command 72. Output sequence control 68 receives demand 72 and, when the memory is not busy, initiates a write operation 69*a* to store that sample in memory 66. The converted sample is held in analog-to-digital converter 63 until the write operation is initiated; at that time, the 11 bits of data in analog-to-digital converter 63 plus the address and special bits (manual inputs) are sampled and transferred to memory information register 66*a* via information fan-in gates 78 and line 79. The memory address for the sample is generated by output sequence control 68 and is transferred via line 67 to memory address register 66*b* at the start of the memory cycle. Addressing is accomplished by an 11-bit binary counter which is advanced by one count each time a new word is stored. Memory sequencing logic 66*d* then takes control of transferring the word in memory information register 66*a* to the cell (not shown) specified by the address in memory address register 66*c*.

As soon as the memory storage cycle is started, input sequence control 71 advances the input channel address to the next multiplexer input channel and initiates transfer of that stored sample to the analog-to-digital converter input. As soon as the transfer is complete, the conversion in the analog-to-digital converter is automatically started. At the end of the conversion cycle, the number in the analog-to-digital converter is transferred via line 81 to memory as previously described.

Input sequence control 71 continues to sequence the conversion and storage operations until the last input channel has been converted and stored. Input sequence control 71 is programmed in advance to process only the number of input channels used. When the last channel has been stored, input frame counter (IFC) 75 is advanced 80 to indicate that a complete input frame of data has been stored. Input sequence control 71 then remains idle until the arrival of another sample rate input pulse 125 at which time the above sequence of events is repeated. Since multiplexer 62 and analog-to-digital converter 63 operate at a fixed rate, the sampled rate pulses may be as slow as desired. The maximum frame rate is limited by the factors previously discussed.

The desired number of frames per record is programmed on the FM patchboard prior to a run and may range from 1 to 999. Input frame counter 75 is a 3 decade BCD counter which coacts from 0–999 and is advanced as each sample is converted. When input frame counter 75 advances to the programmed number of frames per record, this is detected by output sequence control 68, and START pulse 68*a* is generated to command output system 302 to initiate readout of that record of data.

Output sequence control 68 also contains a counter (not shown) which holds the address of the word to be read from memory 66. At the end of each record readout, this counter is set to contain the addresses of the first word in the next record.

When START command 68*a* occurs, output system 302 starts the tape (not shown in FIG. 3) in motion. After a suitable start delay has elapsed, the tape will be at rated speed, and the proper record gap spacing will have been made. Output system 302 then generates read demand 68*b* to obtain the first word of the record from memory 66. As soon as the memory is free this word is read out and is recorded on tape. The counter in output sequence control 68 is also advanced to contain the address of the next word in the output record. Each time a new word is needed, output system 302 generates a read demand 68*b* and the next word is read from memory.

The readout process is continued until the last word in the output record has been transferred to output system 302. At this time, the number in the output sequence control address counter equals the stored address of the last word in the record. STOP command 68*c* is then generated to inhibit further data readout and to halt tape motion. The output address counter is now advanced one more count so that it contains the address of the first word in the next record.

It is to be noted that when a single channel of data is processed, the system is re-programmed to generate a predetermined output record format. Input sample rate 125 then defines a sample rate on the single channel rather than a frame rate on multiple channels. Namely, when a single input channel is processed, multiplexer 62 is by-passed and 120*b* input voltage is sent directly to a sample-and-hold amplifier (not shown) ahead of analog-to-digital converter 63. This amplifier periodically samples the voltage input and stores the sampled level while the converter produces an equivalent 11-bit binary number.

It is to be noted that where the analog inputs are derived from magnetic tape, it is desirable to generate the sample rate from a reference frequency which was also recorded on the tape at the same time that the data was recorded, thus compensating for sample rate errors induced by tape speed variations which may arise during playback of the tape.

Although the invention has been described with particular reference to the embodiment shown, this has been done by way of illustration rather than limitation. It is apparent that many modifications and variations of this invention as hereinbefore set forth may be made without departing from the spirit and scope thereof.

For example, the processing of two different pulse code modulation data formats is as follows: to process a first pulse code modulation format consisting of parallel NRZ binary data words recorded in parallel across a 16-track magnetic tape, separate tracks containing frame and subframe sync pulses, information bits are fed to serial/parallel register 65 from where they are stored in memory along with identification information. The frame sync pulses are fed to the same input sequence control 71 used to control all other FM and digital inputs. This element controls the number of frames per record stored and controls the readout operations the same way that they are processed for all other FM and digital inputs. To process a second type of pulse code modulation data consisting of serial NRZ inputs, with frames and subframes being identified by periodic binary codes within the serial pulse train, a bit rate synchronizer, frame and subframe synchronizer are added to control entry of data into the serial/parallel register. From that point, the subsystem control logic functions to store and readout the data as in all other operations.

Accordingly, we reserve to ourselves any variations or modifications apparent to those skilled in the art and/or falling within the scope of the following claims.

What is claimed is:

1. Apparatus for processing concurrently raw test data acquired in various formats from a plurality of input devices to suitable format for entry into a digital data output utilization device, comprising: patch bay means connected to all of said input devices, pulse duration modulated converting means connected to said patch bay means for converting pulse duration modulated data pulses in said input devices to binary words, analog-to-digital converting means connected to said patch bay means for converting analog voltage input data in said input devices to binary words, a corresponding pair of memory means connected to each other and to each of said converting means, means for transferring sequentially a predetermined number of said binary words to said pair of memory means, and means for transferring said words stored in said memory means to an output digital utilization device in a sequential manner.

2. The apparatus as described in claim 1 wherein said pulse duration modulated means comprises a plurality of pulse duration modulated converting means, means for processing input sinusoidal rate data, and synchronizing means for controlling the amount of input data to be converted in a predetermined time.

3. The apparatus as described in claim 2 wherein each of said pair of memory means comprises a plurality of memory blocks to form an upper-half and a lower-half of memory, two of each of said blocks associated with each of said plurality of pulse duration modulated means and with said rate data processing means, each of said blocks belonging to either the upper or lower half of said memory, said synchronizing means controlling the desired half of memory such that storing of information in one-half of memory is simultaneous with readout of information stored in the other half of said memory.

4. Apparatus as described in claim 1 wherein said analog-to-digital converting means comprises multiplexing means for periodically sampling and storing raw data in the form of input analog voltages, means for sequentially converting said stored samples to binary words, and means for transferring said converted binary words to said memory means in a predetermined sequential manner.

(References on following page)

References Cited

UNITED STATES PATENTS

| | | | |
|---|---|---|---|
| 2,905,930 | 9/1959 | Golden | 340—172.5 |
| 3,020,525 | 2/1962 | Garrison et al. | 340—172.5 |
| 3,059,228 | 10/1962 | Beck et al. | 340—172.5 X |
| 3,094,609 | 6/1963 | Weiss | 340—172.5 |
| 3,164,824 | 1/1965 | Fredericks et al. | 340—347 |
| 3,221,309 | 1/1965 | Benghiat | 340—172.5 |

ROBERT C. BAILEY, *Primary Examiner.*

P. L. BERGER, R. ZACHE, *Assistant Examiners.*